United States Patent [19]
Dwivedi et al.

[11] Patent Number: 5,667,742
[45] Date of Patent: Sep. 16, 1997

[54] METHODS FOR MAKING PREFORMS FOR COMPOSITE FORMATION PROCESSES

[75] Inventors: Ratnesh Kumar Dwivedi, Wilmington; Thomas James Henderson, Bear, both of Del.; David Francis Friel, Sewell, N.J.

[73] Assignee: Lanxide Technology Company, LP, Newark, Del.

[21] Appl. No.: 260,510

[22] Filed: Jun. 15, 1994

Related U.S. Application Data

[63] Continuation of Ser. No. 12,169, Feb. 2, 1993, abandoned.

[51] Int. Cl.$^6$ .................................................. C04B 35/64
[52] U.S. Cl. ........................ 264/658; 264/669; 264/670; 419/5; 419/27; 419/36; 419/37
[58] Field of Search .......................... 264/60, 63; 419/5, 419/27, 36, 37

[56]  References Cited

U.S. PATENT DOCUMENTS

| | | | |
|---|---|---|---|
| 4,818,454 | 4/1989 | Urquhart | 264/60 |
| 4,820,461 | 4/1989 | Creber | 264/60 |
| 4,824,622 | 4/1989 | Kennedy | 264/60 |
| 5,153,057 | 10/1992 | Corbett | 264/63 |

FOREIGN PATENT DOCUMENTS

| | | | |
|---|---|---|---|
| 0109241 | 5/1984 | European Pat. Off. | |
| 919372 | 2/1963 | United Kingdom | 264/63 |
| 966945 | 8/1964 | United Kingdom | 264/63 |
| 1510313 | 5/1978 | United Kingdom | |
| 9117969 | 11/1991 | WIPO | |

OTHER PUBLICATIONS

Database WPI week 8636, Derwent Publications Ltd.; London, GB; AN 86-236396 & JP-A-61 166 932.

Database WPI week 8806, Derwent Publications, Ltd.; London, GB; AN 88-039312 & JP-A-62 297 427.

Patent Abstracts of Japan, vol. 15, No. 43 (C-0801) 31/01/91 & JP-A-2 277 732.

*Primary Examiner*—James Derrington
*Attorney, Agent, or Firm*—Kevin J. Boland

[57]  ABSTRACT

The present invention relates to novel methods for shaping a filler material into a porous preform and subsequently filling at least a portion of the porous preform with a second material to form a composite body. Specific aspects of the invention include novel combinations of materials to form the preform in combination with novel processing techniques for shaping the combinations of materials into a porous preform.

32 Claims, 3 Drawing Sheets

Fig_4

METHODS FOR MAKING PREFORMS FOR COMPOSITE FORMATION PROCESSES

This is a continuation of application Ser. No. 08/012,169 filed on Feb. 2, 1993 now abandoned.

FIELD OF THE INVENTION

The present invention relates to novel methods for shaping a filler material into a porous preform and subsequently filling at least a portion of the porous preform with a second material to form a composite body. Specific aspects of the invention include novel combinations of materials to form the preform in combination with novel processing techniques for shaping the combinations of materials into a porous preform.

BACKGROUND OF THE INVENTION

Many traditional shaping techniques exist for forming loose masses of particulate, fibers, whiskers, etc., into a desired shape followed by some set of processing conditions which typically involve high temperature exposures. For example, many traditional ceramic processing techniques such as slip casting, dry pressing, isostatic pressing, hot pressing, extrusion, etc., each involves the consolidation of an initial loose mass or unbonded array of constituents into a shaped member having at least some structural integrity. Moreover, in each of these techniques some means for initially holding the loose mass together until the loose mass can itself consolidate into a preferred shape is necessary. Common to many of the traditional approaches is the use of a binder system which imparts at least some initial "green" strength to the body to permit the body to hold its predetermined shape.

Further, common to each of the aforementioned traditional techniques is the application of thermal energy. A primary purpose of the application of thermal energy is to permit individual constituents of the green body to begin to, for example, sinter together to form a more rigid body. Typically, when such sintering occurs, a part will change in size and/or shape due to porosity in the green body being consolidated. It is during such sintering operations that cracking, bending, and/or uncontrolled shrinking may occur. The art is replete with many techniques for controlling undesirable aspects associated with traditional sintering processes.

The art also includes processing techniques for the formation of composite bodies. For example, rather than starting with any of the constituents discussed above and causing such constituents to consolidate into a dense, shaped body, the art teaches that porosity in a first material can be filled with a second material to form a desirable composite body. For example, the porosity in a first formed body could be filled with an inorganic material such as a ceramic or a glass, a polymer, a metal or alloy, an intermetallic and the like. The impetus for forming a composite body is to achieve a synergistic interaction between the constituents of the composite. Specifically, a single material by itself may not be able to withstand certain corrosive and/or erosive environments and/or certain high temperature environments, etc. However, by combining two or more materials together, desirable attributes of both materials may be utilized to overcome the shortcomings of a single material.

A key element for reliably and economically producing desirable composite materials involves the ability to produce economically and reliably a shaped first material into which a second material can be introduced. Many techniques exist for shaping a porous first material into an acceptable body for introduction of a second material or matrix therein; however, the search continues for better techniques to form porous first materials. This invention attempts to satisfy the need for achieving a reliably and economically produced first material which reliably and economically accepts a second material to result in a desirable composite body.

DESCRIPTION OF COMMONLY OWNED PATENT APPLICATIONS

A method for producing ceramic composite bodies having a predetermined geometry or shape is disclosed in Commonly Owned and Copending U.S. Pat. No. 5,017,526 which issued May 21, 1991, which is a continuation of U.S. application Ser. No. 06/861,025, filed May 8, 1986 (and now abandoned), both in the names of Marc S. Newkirk et al., a European counterpart to which was published in the EPO on Jan. 22, 1986. In accordance with the method in this U.S. Patent, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/295,488, filed Jan. 10, 1989 (and now abandoned), which is a continuation of U.S. Pat. No. 4,923,832, which issued May 8, 1990, both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. patent application Ser. No. 07/329,794, filed Mar. 28, 1989 and now U.S. Pat. No. 5,051,382, issued Sep. 24, 1991), which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

A method for tailoring the constituency of the metallic component of a ceramic matrix composite structure is disclosed in Copending and Commonly Owned U.S. Pat. No. 5,017,533, which issued on May 21, 1991, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby".

Moreover, U.S. patent application Ser. No. 07/269,152, filed Nov. 9, 1988 (and now abandoned), which is a continuation of U.S. patent application Ser. No. 07/152,518, which issued as U.S. Pat. No. 4,818,734, which issued Apr. 4, 1989), in the names of Robert C. Kantner et al., which was a Continuation-in-Part Application of the above-mentioned Serial No. 06/908,454, having the same title and also being Commonly Owned. This Patent and the above-mentioned application Ser. No. 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy, in the case of using oxygen as an oxidant, comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

A novel method of making a metal matrix composite material is disclosed in Commonly Owned U.S. Pat. No. 4,828,008, issued May 9, 1989, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Patent No. 4,935,055, issued Jun. 19, 1990, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. Patent Application Serial No. 07/517,541, filed Apr. 24, 1990, which is a Rule 62 continuation of U.S. patent application Ser. No. 07/168,284, filed Mar. 15, 1988 (and now abandoned), both in the names of Michael K. Aghajanian and Marc S. Newkirk and entitled "Metal Matrix Composites and Techniques for Making the Same." In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/521,043, filed May 9, 1990, which is a continuation-in-part of U.S. patent application Ser. No. 07/484,753, filed Feb. 23, 1990, which is a continuation-in-part of U.S. patent application Ser. No. 07/432,661, filed Nov. 7, 1989 (and now abandoned), which is a continuation-in-part of U.S. patent application Ser. No. 07/416,327, filed Oct. 6, 1989 (and now abandoned), in the names of Aghajanian, et al. and entitled "A Method of Forming Metal Matrix Composite Bodies by a Spontaneous Infiltration Process, and Products Produced Therefrom". According to this Aghajanian, et al. invention, spontaneous infiltration of a matrix metal into a permeable mass of filler material or preform, at least at some point during the process, which permits molten matrix metal to spontaneously infiltrate the filler material or preform. Aghajanian, et al. disclose a number of matrix metal/infiltration enhancer precursor/ infiltrating atmosphere systems which exhibit spontaneous infiltration. Specifically, Aghajanian, et al. disclose that spontaneous infiltration behavior has been observed in the aluminum/magnesium/nitrogen system; the aluminum/ strontium/nitrogen system; the aluminum/zinc/oxygen system; and the aluminum/calcium/nitrogen system. However, it is clear from the disclosure set forth in the Aghajanian, et al. invention that the spontaneous infiltration behavior should occur in other matrix metal/infiltration enhancer precursor/infiltrating atmosphere systems.

A novel method of forming a metal matrix composite by infiltration of a permeable mass of filler contained in a ceramic matrix composite mold is disclosed in Commonly Owned U.S. Pat. No. 4,871,008, issued Oct. 3, 1989, which issued from U.S. patent application Ser. No. 07/142,385, filed Jan. 11, 1988, by Dwivedi et al., both entitled "Method of Making Metal Matrix Composites". According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patent describes a method for the production of a metal matrix composite body, which may be bonded to a ceramic matrix composite body, and the novel bodies which are produced therefrom.

A method of forming macrocomposite bodies by a somewhat related process is disclosed in Commonly Owned and Copending U.S. patent application Ser. No. 07/484,575, filed on Feb. 23, 1990, in the names of Marc S. Newkirk et al., and entitled "Methods for Forming Macrocomposite Bodies and Macrocomposite Bodies Produced Thereby". This application is a continuation-in-part application of application Ser. No. 07/405,747, filed on Sep. 11, 1989 (and now abandoned), in the names of Marc S. Newkirk et al., and entitled "Methods for Forming Macrocomposite Bodies and Macrocomposite Bodies Produced Thereby", which in turn is a continuation-in-part application of application Ser.

No. 07/376,416, filed on Jul. 7, 1989 and now abandoned), which is a continuation-in-part of U.S. patent application Ser. No. 07/368,564, filed on Jun. 20, 1989, which is in turn a continuation-in-part of U.S. patent application Ser. No. 07/269,464, filed on Nov. 10, 1988 (and now U.S. Pat. No. 5,040,588, issued Aug. 20, 1991), all in the names of Marc S. Newkirk et al., and entitled "Methods for Forming Macrocomposite Bodies and Macrocomposite Bodies Produced Thereby". These applications disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process similar to the process of the instant invention is disclosed in Commonly Owned and Copending U.S. patent application Ser. No. 07/381,523, filed on Jul. 18, 1989, in the names of Robert C. Kantnet et al., and entitled "A Method of Forming Metal Matrix Composite Bodies by a Self-Generated Vacuum Process and Products Produced Therefrom". This patent application discloses a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

The entire disclosures of the above-described commonly owned patents and patent applications are expressly incorporated herein by reference.

SUMMARY OF THE INVENTION

The present invention relates to novel combinations of materials and novel processing techniques for making preforms which are used in various composite formation processes. The novel combination of materials includes at least one organic binder, at least one high temperature binder and at least one filler material which are combined to result in a substantially homogeneous synergistic mixture having good flow characteristics. The good flow characteristics are achieved by assuring that said at least one organic binder coats the surface of the filler material to modify surface characteristics of the filler and to permit the filler material mixture to be free flowing. This filler material mixture is then placed into a suitable molding device having a cavity therein which corresponds substantially in size and shape to a final desired shape of the preform. The shaped filler material assumes the shape of the cavity by causing the organic binder to at least partially set. After partial setting is achieved, the shaped filler material mixture is heated to a higher temperature resulting in substantial removal of the organic binder and further binding of the shaped filler due to the at least one second (i.e., the high temperature) binder. Continued heating of the shaped mixture can result in an at least partial sintering of the filler to occur to result in a partially sintered porous preform. The resulting partially sintered preform can thereafter be utilized in combination with an acceptable composite formation process including an inorganic composite formation process (e.g., ceramics and glasses), a polymer matrix composite formation process, a metal matrix composite formation process, an intermetallic composite formation process.

In a preferred embodiment for practicing the invention, the apparatus which is utilized to form the aforementioned preform includes all of those apparatuses currently being utilized to make molds or cores for metal casting operation. Specifically, for example, there are many automated pieces of equipment that are utilized for making sand shells or sand cores. Examples of shell molding and core making equipment can be found in numerous known references, an example of which is a reference book entitled "Aluminum Casting Technology", American Foundrymen's Society, Inc., 1986, pp. 186–197, the subject matter of which is incorporated herein by reference. Specifically, by utilizing these known automated techniques for making sand shell molds or sand cores in combination with the above-described filler material mixture, preforms can be rapidly, reliably and economically produced. The combination of the aforementioned materials with known sand molding and core making equipment unexpectedly results in desirable preforms. Specifically, traditional uses of shell molding and core making equipment have been directed, typically, to utilizing coarse sand particles which are placed into desirably shaped molds in combination with appropriate binders or resins. These shell molding and core making machines have historically been utilized to produce sand molds or cores which define outer shapes or boundaries of unreinforced metals which are poured into such cavities (i.e., metals typically do not infiltrate into the sand molds). After metals have been poured into the shell molds or shell cores, the molds are typically destroyed leaving behind a part which inversely replicates the cavity of the shell or core. However, by modifying the constituents (i.e., sand mixtures) which are typically utilized in the sand shell molding and core making processes, it has been unexpectedly discovered that the bodies which are produced from such equipment can be utilized in various composite formation processes. Thus desirable results which occur due to a combination of the aforementioned concepts is completely unexpected.

Definitions

"Barrier" or "barrier means", as used herein in conjunction with ceramic matrix composite bodies, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Barrier" or "barrier means", as used herein, in conjunction with metal matrix composite bodies, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Dopants", as used herein, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein, in conjunction with the composites referenced herein, means either single constituents or mixtures of constituents which are substantially non-reactive with and/or of limited solubility in the matrix and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fillers such as carbon fibers coated with alumina or silicon carbide to protect the carbon from attack, for example, by a molten aluminum parent metal. Fillers may also include metals. For example, refractory metals such as tungsten, tantalum and molybdenum could be used as fillers.

"Glass Matrix Composite" as used herein, means a material comprising a three-dimensionally interconnected glass which embeds one or more reinforcing or filler materials which themselves can be either discontinuous or continuous. The glass matrix may comprise traditional glass materials, but such glass matrix should not be unduly construed as being limited to a glass material in the classical sense, that is, in the sense that it consists entirely of non-metallic and inorganic materials, but may also refer to a material which is predominantly glass with respect to either composition or dominant properties, although the material may also contain minor or substantial amounts of one or more intermetallic, metallic and/or organic constituents (isolated and/or interconnected).

"Green", as used herein in conjunction with filler materials and preforms, refers to a filler material or preform before any insertion of a matrix material into the filler material or preform has occurred. Thus a filler material or preform that has been fired at an elevated temperature (for example, to volatilize a binder) should be considered to be "green" so long as the filler material or preform has not been filled with a matrix material.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Metal Matrix Composite" or "MMC", as used herein means a material comprising a two- or three-dimensionally interconnected alloy or matrix metal which has embedded a preform or filler material. The matrix metal may include various alloying elements to provide specifically desired mechanical and physical properties in the resulting composite.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Parent Metal", as used herein, means that metal(s) (e.g., aluminum, silicon, titanium, tin and/or zirconium) which is the precursor of a polycrystalline oxidation reaction product (e.g., oxides, parent metal borides, or other parent metal boron compounds, etc.) and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, zirconium, etc.), the metal identified should be read with this definition in mind unless indicated otherwise by the context.

"Polymer Matrix Composite" or "PMC", as used herein, means a material comprising a three-dimensionally interconnected polymer which embeds one or more reinforcing or filler materials which themselves can be either discontinuous or continuous. The polymer may be suitably modified to provide specifically desired mechanical and/or physical properties in the resulting composite.

"Preform" or "Permeable Preform", as used herein, means a porous mass of filler or filler material which is manufactured with at least one surface boundary which essentially defines a boundary for infiltrating an appropriate matrix material (e.g., matrix metal or matrix alloy, oxidation reaction product, ceramic, polymer, intermetallic, etc.), such mass retaining sufficient shape integrity and green strength to provide dimensional fidelity without any external means of support prior to being infiltrated by the matrix material. The mass should be sufficiently porous to permit infiltration of the matrix material. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform exist either singularly or as an assemblage.

"Second or Foreign Metal", as used herein, means any suitable metal, combination of metals, alloys, intermetallic compounds, or sources of either, which is, or is desired to be, incorporated into the metallic component of a formed ceramic composite body in lieu of, in addition to, or in combination with unoxidized constituents of the parent metal. This definition includes intermetallic compounds, alloys, solid solutions or the like formed between the parent metal and a second metal.

"Spontaneous Infiltration", as used herein, means that the infiltration of matrix metal into the permeable mass of filler or preform occurs without requirement for the application of pressure or vacuum (whether externally applied or internally created).

DETAILED DESCRIPTION OF THE INVENTION

The present invention relates to novel combinations of materials and novel processing techniques for making preforms which are used in various composite formation processes. The novel combination of materials includes at least one organic binder, at least one high temperature binder and at least one filler material which are combined to result in a substantially homogeneous synergistic mixture having good flow characteristics. The good flow characteristics are achieved by assuring that said at least one organic binder coats the surface of the filler material to modify surface characteristics of the filler and to permit the filler material mixture to be free flowing. This filler material mixture is then placed into a suitable molding device having a cavity therein which corresponds substantially in size and shape to a final desired shape of the preform. The shaped filler material assumes the shape of the cavity by causing the organic binder to at least partially set. After partial setting is achieved, the shaped filler material mixture is heated to a higher temperature resulting in substantial removal of the organic binder and further binding of the shaped filler due to the at least one second (i.e., the high temperature) binder. Continued heating of the shaped mixture can result in an at least partial sintering of the filler to occur to result in a partially sintered porous preform. The resulting partially sintered preform can thereafter be utilized in combination with an acceptable composite formation process including an inorganic composite formation process (e.g., ceramics and glasses), a polymer matrix composite formation process, a metal matrix composite formation process, an intermetallic composite formation process.

In a preferred embodiment for practicing the invention, the apparatus which is utilized to form the aforementioned preform includes all of those apparatuses currently being utilized to make molds or cores for metal casting operation. Specifically, for example, there are many automated pieces of equipment that are utilized for making sand shells or sand cores. Examples of shell molding and core making equipment can be found in numerous known references, an example of which is a reference book entitled "*Aluminum Casting Technology*", American Foundrymen's Society, Inc., 1986, pp. 186–197, the subject matter of which is incorporated herein by reference. Specifically, by utilizing these known automated techniques for making sand shell molds or sand cores in combination with the above-described filler material mixture, preforms can be rapidly, reliably and economically produced. The combination of the aforementioned materials with known sand molding and core making equipment unexpectedly results in desirable preforms. Specifically, traditional uses of shell molding and core making equipment have been directed, typically, to utilizing coarse sand particles which are placed into desirably shaped molds in combination with appropriate binders or resins. These shell molding and core making machines have historically been utilized to produce sand molds or cores which define outer shapes or boundaries of unreinforced metals which are poured into such cavities (i.e., metals typically do not infiltrate into the sand molds). After metals have been poured into the shell molds or shell cores, the molds are typically destroyed leaving behind a part which inversely replicates the cavity of the shell or core. However, by modifying the constituents (i.e., sand mixtures) which are typically utilized in the sand shell molding and core making processes, it has been unexpectedly discovered that the bodies which are produced from such equipment can be utilized in various composite formation processes. Thus desirable results which occur due to a combination of the aforementioned concepts is completely unexpected.

The selection of the combination of the at least one organic binder, the at least one high temperature binder and the at least one filler is important because this combination of materials should result in a mixture which, under normal processing, can be made to be homogeneous and should result in a good flowability. In this context, good flowability means that the resultant homogeneous mixture can be placed into a mold having, for example, a complicated shape and, with little difficulty (e.g., low pressures), be induced to fill the cavity of the mold homogeneously. In this regard, low pressures may involve only a few tens of psi to a few hundreds of psi. These lower pressures enable the molds into which the homogeneous mixture is placed not to be overly strong or stiff because mechanical requirements on the molds are quite low. This is to be contrasted with, for example, typical dry pressing of similar mixtures where several thousands of psi are required to obtain the desirable body.

The specific choice of one or more organic binder(s) includes those organic binders, which typically, can be catalyzed by, for example, a liquid, a solid, a vapor, thermal treatment, etc., to result in the binder at least partially setting to permit the at least one filler to assume a desired shape. In addition, the binder favorably interacts with the filler to cause the filler to have good flowability. Without wishing to be bound by any particular theory or explanation, it is possible that the organic binder somehow modifies the surface of the filler (e.g., renders the surface more smooth and/or ameliorates any negative surface charges on the particles, etc.) to cause the particles to flow into a mold without significant exertion of force. In this regard, suitable thermosetting organic binders include, for example, phenol-formaldehyde resins, furan or phenolic resins and various oils (e.g., core oil). Suitable self-setting binders include, for example, furan baked resins, phenolic baked resins and urethanes. Further, acceptable vapor cured binders include, for example, phenolic urethane-amines, furan-sulfur dioxides, etc. However, it should be understood that the above list is merely a representative of a large class of acceptable organic binders.

In addition to the at least one organic binder, it is desirable for at least one second binder to be utilized in combination with the organic binder(s). Typically, the second binder is a binder which begins to function as a binder at a point where the organic binder begins to loose its ability to bind the filler together. In this regard, various inorganic binders, clays, colloidal oxide materials etc., may be used in combination with an organic binder to achieve the desired result. It should be understood that more than a single organic binder in combination with more than a single high temperature binder may be desirable depending upon the intended firing schedule, composition of filler material, etc. The total amount of binder required to achieve the desired synergistic results is typically, within the range of about 1–15% by weight, with the preferred range being about 4–11% by weight.

Filler materials acceptable for use in the present invention include all of those materials which are capable of being shaped by the techniques of the present invention. Particularly preferred filler materials include those materials which can impart desired properties to the resultant composite body (e.g., may impart improved wear or corrosion resistance, better thermal conductivity, better electrical conductivity, etc.). In addition, the filler materials should be capable of being formed into desired shapes reliably, economically, and reproducibly. When it is desired to make a shape by the aforementioned sand making or core making automated technologies, it may be desirable for the filler particles to be relatively symmetric (e.g., relatively equiaxed) as opposed to being extremely asymmetrical (e.g., continuous fibers or long fibers). However, any filler material which is capable of being shaped by the techniques of the invention is capable of being utilized.

Once a desired homogeneous mixture of filler material and binder(s) has been formed, the mixture should be placed into an acceptable mold cavity. Acceptable mold cavities can be made from any suitable material including metals, ceramics, polymers, composites, graphites, wood, etc. An important requirement of the mold is that the mold needs to exhibit sufficient stiffness so as to be able to accept the filler material mixture under the small pressures required by the mixtures so as not to deform in shape to result in a shaped mass of filler which reliably reproduces in size and shape the cavity in the mold.

Once the filler material mixture has been placed into a mold cavity, it is desirable for the organic binder to begin to set so that the filler can assume the shape of the cavity in the mold. Once the organic binder begins to set, it is then possible to remove the shaped filler from the mold and further heat the shaped filler mixture. However, in some instances, it may be desirable for a filler mixture to remain in the mold for at least a portion of subsequent heating treatments.

Eventually, the filler material mixture needs to be subjected to sufficiently high temperatures to cause at least partial sintering of the filler to occur, thus resulting in an at least partially sintered preform. The amount of sintering desired depends on a number of factors including the desired degree of interconnectivity of the filler in the preform, the strength needed by the preform to withstand a subsequent matrix formation process, etc.

Once a preform has been desirably manufactured, the preform can be subjected to a composite formation process. In this regard, the preform should be manufactured so as to have a sufficient amount of porosity (e.g., 40–70 volume percent) and a desirable type of porosity (e.g., at least partially interconnected). The desirable amounts and type of porosity vary depending upon the matrix formation process. For example, in the aforementioned commonly owned ceramic matrix patents and patent applications and metal matrix patents and patent applications, desirable amounts of porosity can range between 10% and 60% and, in many cases, it is desirable for the porosity to be interconnected so that either of the ceramic matrix or metal matrix can substantially completely fill the porosity. However, in other instances it may be desirable for there to be at least some isolated porosity so as to achieve various desirable properties (e.g., selected insulation) in the resultant composite body.

In addition to the matrix formation processes discussed in the aforementioned commonly patents and patent applications, preforms according to the present invention could be utilized for conventional polymer matrix composite formation processes, conventional metal matrix composite formation processes including, for example, squeeze casting, pressure or vacuum infiltration, etc.

Once a synergistic combination of binders and filler materials is achieved, the mixture can be processed in a substantially conventional manner by substantially conventional shell molding and core making machines. In this regard, there is well known production equipment, many of which are automatic or semiautomatic machines, which produces shell molds or cores. However, this equipment typically utilizes relatively coarse grained sand materials because coarse grained sand is relatively inexpensive and relatively simple to process. As materials become finer, the difficulty of handling these materials increases, however, such materials can still be reliably processed by these techniques. Accordingly, the preferred embodiment of the invention, utilization of the above-described filler material mixture in combination with substantially conventional and available shell molding and core making equipment can result in reliably, economically, and efficiently produced preforms for use in all of the aforementioned composite formation processes.

Example 1

This Example demonstrates a method for forming a preform and spontaneously infiltrating the preform with a molten aluminum alloy in accordance with the present invention.

A preform mixture was prepared by placing about 800 grams of 22 μm precision alumina (Norton Co., Worcester, Mass.), about 32 grams of Novalac Durite AD-5614 phenolic resin powder (Bordon Packaging and Ind. Prod., Columbus, Ohio), about 40 grams of 6 TILE™ bulk clay (Dry Branch Kaolin Company, Dry Branch, Ga.), and about 800 grams of alumina grinding media into a 2 liter plastic jar. The jar was sealed and placed on a roll mill for about 1 hour. After about 1 hour, the plastic jar was removed from the roll mill and an about 16 gram mixture comprising by weight about 80% BLUONIC® A colloidal alumina (purchased from Wesolite Company, Wilmington, Del.) and about 20% of a 30% polyvinyl alcohol solution (Du Pont, Wilmington, Del.) was added to the jar. The jar was resealed and placed on a roll mill for about 1 hour.

After about 1 hour, the jar was removed from the roll mill and the contents of the jar was sieved through a 20 mesh screen using a RO-TAP® testing sieve shaker 12 inch model, W. S. Tyler, Gastovia, N.C.) to separate the preform mixture from the alumina grinding media.

Utilizing a small metal spoon, a quantity of the preform mixture was then placed into a steel mold cavity having internal dimensions of about 5 inches by about 7 inches by about 1¼ inch. The preform mixture was leveled within the mold utilizing a foam brush. The preform mixture within the mold was then condensed into a preform by subjecting the mixture to a pressure of about 229 psi. After subjecting the preform mixture to a pressure of about 229 psi for about 1 minute, the pressure was released and the mold and preform mixture were placed into an air atmosphere furnace having a temperature of about 150° C. After remaining in the furnace for about 1 hour, the mold and preform mixture were removed from the air atmosphere furnace, the mold was disassembled and the preform, having dimensions of about 3 inches×about 7 inches×about 1¼ inch, was recovered.

A bed of 90 grit 38 ALUNDUM® alumina (Norton Company, Worcester Mass.) was poured into a refractory boat and leveled. The preform was placed on the bed of 90 grit 38 ALUNDUM® alumina. The refractory boat and its contents were placed into an air atmosphere furnace at a temperature of about 100° C. The temperature within the furnace was raised from about 100° C. to about 1200° C. at a rate of about 100° C. per hour. After maintaining a furnace temperature of about 1200° C. for about 5 hours, the furnace was cooled at a rate of about 150° C. per hour to about 100° C. and the refractory boat and its contents were removed from the furnace and allowed to cool to room temperature.

After cooling to about room temperature, the preform was placed on a balance and a preform weight of about 805 grams was recorded.

Figure 1:
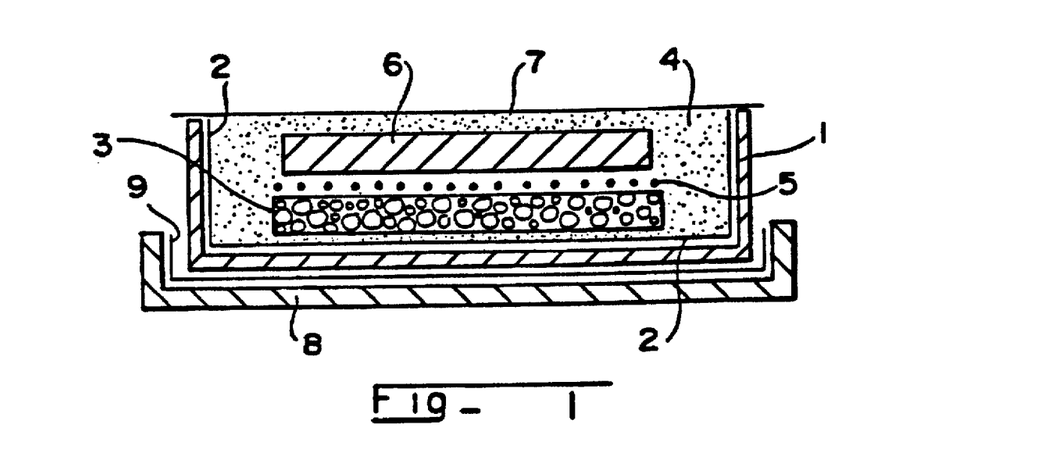
FIG. 1 is a cross-sectional view of the setup used to form the metal matrix composite body of Example 1.

As shown in FIG. 1, a stainless steel box 1 measuring about 6 inches by about 9 inches by about 4 inches high was prepared by lining the interior surfaces of the box with GRAFOIL® graphite foil 2 (Union Carbide Company, Danbury, Conn.) having a thickness of about 0.015 inch.

The preform was then coated with an aqueous solution comprising DAG® 154 colloidal graphite (Acheson Collids Co., Port Huron, Mich.). Utilizing a foam brush, the surface to be placed in contact with the aluminum matrix alloy was coated with a light, uniform coating of the DAG® 154 colloidal graphite. The remaining five surfaces of the preform were coated three times with the DAG® 154 colloidal graphite. Before applying the second coating of DAG® 154 colloidal graphite, the first coating was allowed to dry substantially completely and before applying the third coating of DAG® 154 colloidal graphite, the second coating was allowed to dry substantially completely. After the DAG® 154 colloidal graphite had dried, the preform 3 was placed into the stainless steel box 1 and centered onto the GRAFOIL® graphite foil 2, with the surface to be placed in contact with the aluminum matrix alloy facing up.

After centering the preform onto the GRAFOIL® graphite foil 2, a barrier mixture 4 comprising by weight about 90% 90 grit 38 ALUNDUM® alumina (Norton Co., Worcester, Mass.) and about 10% glass frit (Fusion Combustion Inc., Carrollton, Ohio) was poured into the stainless steel box 1, onto the GRAFOIL® graphite foil 2 and around the preform 3 to a height approximately equal to the top portion of the preform 3.

After ensuring that the top surface of the preform 3 was not in contact with any barrier mixture 4, an even layer comprising about 2.6 grams of a high purity magnesium powder mixture 5 comprising particles ranging in size from about −50 mesh to about +100 mesh (Hart Metals, Tamaqua, Pa.) was sprinkled onto the top surface of the preform 3. An aluminum alloy ingot 6 comprising by weight about 7% magnesium and the balance aluminum, having dimensions of about 3.5 inches×7 inches×1½ inches, and weighing about 1488 grams was placed into the stainless steel box and centered over the preform 3.

After placing the aluminum alloy ingot 6 into the stainless steel box 1, additional barrier mixture 4 was placed into the boat and around and on top of the aluminum alloy ingot 6. The stainless steel box 1 was then covered with a sheet of GRAFOIL® graphite foil 7. The stainless steel box 1 covered with the GRAFOIL® graphite foil 7 was then placed onto a graphite boat 8 measuring about 11 inch×19 inch×1 inch, which had previously been lined with GRAFOIL® graphite foil g, to form a setup.

The setup was then placed into a controlled atmosphere vacuum furnace at a temperature of about 150° C. The furnace was evacuated to about 30 inches Hg and backfilled with nitrogen gas to about atmospheric pressure. The furnace was evacuated a second time to about 30 inches Hg and backfilled with nitrogen gas to about atmospheric pressure and a nitrogen gas flow rate of about 15 liters per minute was established through the furnace.

The furnace temperature was increased from about 150° C. to about 450° C. at a rate of about 200° C. per hour. After maintaining a temperature of about 450° C. for about 20½ hours, the furnace temperature was increased from about 450° C. to about 825° C. at a rate of about 200° C. per hour. After maintaining a temperature of about 825° C. for about 40 hours, the setup was removed from the furnace and the steel box 1 and its contents was placed onto a water cooled copper chill plate to directionally solidify the contents of the steel box.

Figure 2:
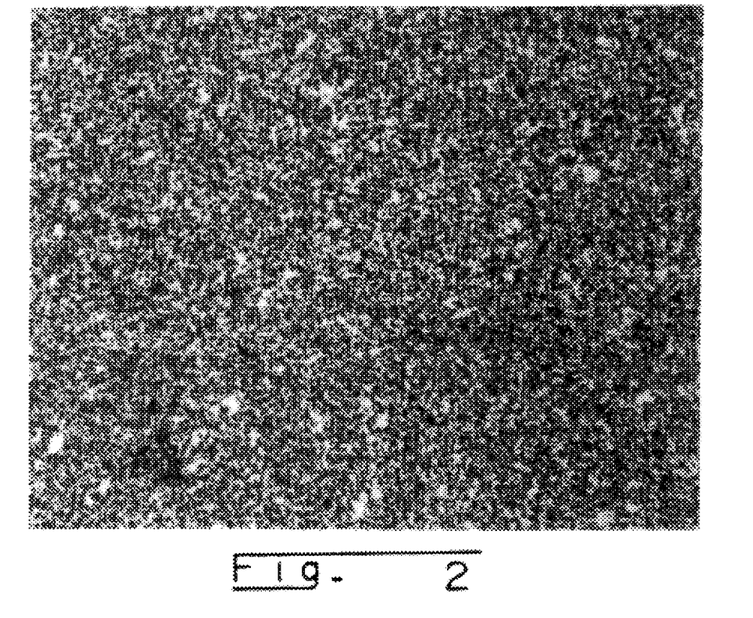
FIG. 2 is a photomicrograph taken at about 50× magnification of the metal matrix composite body formed in Example 1.
Figure 3:
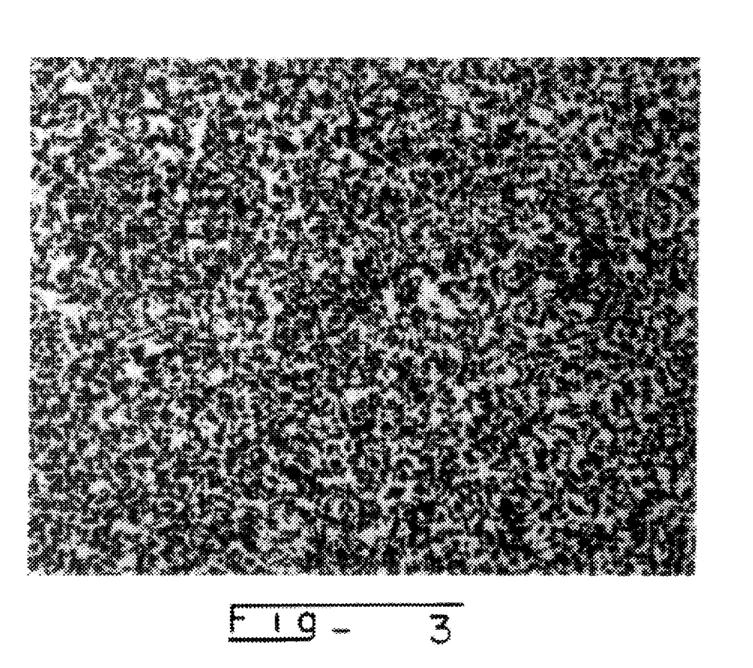
FIG. 3 is a photomicrograph taken at about 100× magnification of the metal matrix composite body formed in Example 1.
Figure 4:
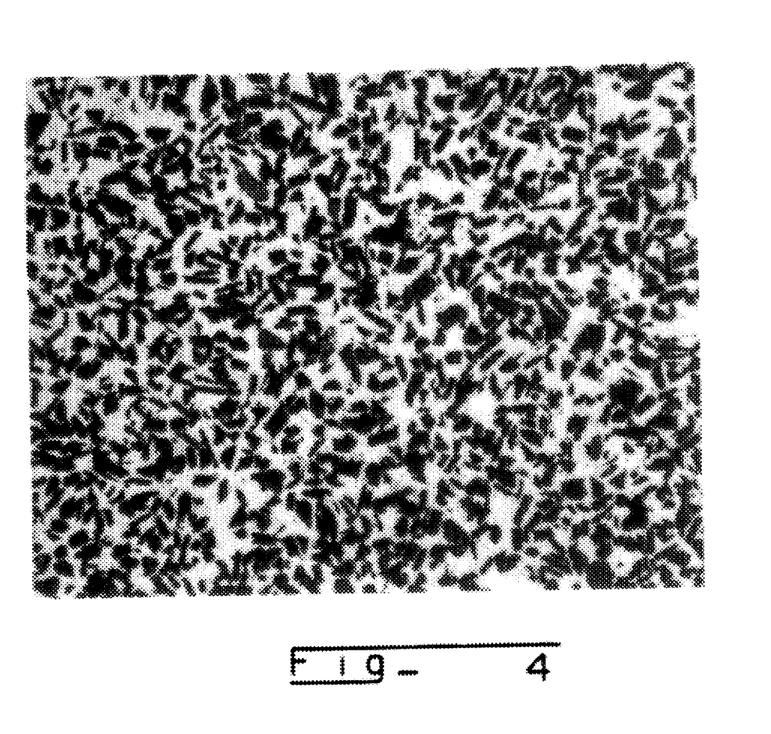
FIG. 4 is a photomicrograph taken at about 200× magnification of the metal matrix composite body formed in Example 1.

At room temperature, the assembly was disassembled to reveal that the aluminum metal had spontaneously infiltrated the preform. The formed metal matrix composite was subsequently cross sectioned, mounted, polished and subjected to quantitative image analysis. FIG. 2 is a photomicrograph of the microstructure of the metal matrix composite at about 50× magnification. FIG. 3 is a photomicrograph of the microstructure of the metal matrix composite at about 100× magnification. FIG. 4 is a photomicrograph of the microstructure of the metal matrix composite at about 200× magnification.

EXAMPLE 2

This Example demonstrates a method for forming two preforms and spontaneously infiltrating the preforms with molten aluminum alloy in accordance with the present invention.

A first binder mixture was prepared by adding about 4.8 grams of diphenyl phosphite (Aldrich Chemical Co., Milwaukee, Wis.) and about 20 grams of NYACOL® 1034A colloidal silica (Nyacol Prod. Inc., Ashland, Mass.) to a plastic jar. After thoroughly mixing the contents of the jar, the mixture was allowed to sit at room temperature for about 20 minutes.

A preform mixture was prepared by placing about 2000 grams of 360 grit 39 CRYSTOLON® green silicon carbide particulate (Norton Co., Worcester, Mass.) and about 40 grams of a second binder comprising the developmental Durite SL-870A liquid phenolic resin (Bordon Chemical, Columbus, Ohio), into the mixing bowl of an Eirich® mixer (Model #RV02, Eirich Machines, Maple, Ontario, Canada). The mixer was turned on low and the mixture was subjected to mixing for about 1 minute. After about 1 minute, the mixer was turned off and the mixture was scraped from the sides and bottom of the mixing bowl towards the center of the bowl and the mixer was turned onto high for about 1 minute. After about 1 minute, the mixer was turned off, the mixture was scraped from the sides and bottom of the mixer bowl towards the center of the bowl and the first binder mixture comprising the diphenyl phosphite/NYACOL® 1034A colloidal silica mixture was placed into the mixing bowl. The mixer was turned onto high for about 2 minutes. After about 2 minutes, the mixer was turned off and the contents of the mixer bowl was sieved through a 14 mesh sieve utilizing a RO-TAP® testing sieve shaker (12 inch model, W. S. Tyler, Gastovia, N.C.).

Utilizing a small metal spoon, a quantity of the preform mixture was then placed into a graphite mold cavity having internal dimensions of about 2 inches by about 9 inches by about 4½ inches. The preform mixture was leveled within the mold utilizing a soft bristle brush and a straight edge. The preform mixture within the mold was then condensed into a preform, having dimensions of about 1 inch by about 9 inches by about 4½ inches, by subjecting the mixture to a pressure of about 123.5 psi. After subjecting the preform mixture to a pressure of about 123.5 psi for about 1 minute, the pressure was released and the mold and preform mixture were placed into an air atmosphere furnace having a temperature of about 150° C. After remaining in the furnace for about 1 hour, the mold and preform mixture were removed from the air atmosphere furnace, the mold was disassembled and the preform was recovered.

A bed of 36 grit 38 ALUNDUM® alumina (Norton Company, Worcester Mass.) was poured into a refractory boat and leveled. The preform was placed on the bed of 36 grit 38 ALUNDUM® alumina. The refractory boat and its contents were placed into an air atmosphere furnace at a temperature of about 100° C. The temperature within the furnace was raised from about 100° C. to about 1100° C. at a rate of about 100° C. per hour. After maintaining a furnace temperature of about 1100° C. for about 6 hours, the furnace was cooled at a rate of about 150° C. per hour to about 100° C. and the refractory boat and its contents were removed from the furnace and allowed to cool to room temperature.

After cooling to about room temperature, the preform was cut in half to produce 2 preforms, each measuring about 4½ inches×about 4½ inches×about 1 inch, and each weighing about 417.45 grams.

The above procedure was repeated substantially identically, except that 220 grit 39 CRYSTOLON® green silicon carbide particulate was used instead of 360 grit silicon carbide, thus producing two preforms, each measuring about 4½ inches×about 4½ inches×about 1 inch, and weighing about 473.98 grams each.

Figure 5:
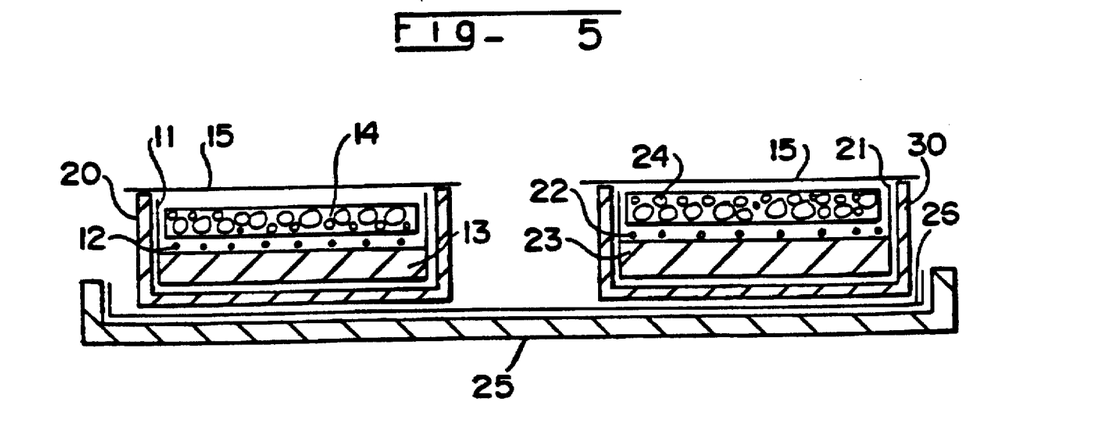
FIG. 5 is a cross-sectional view of the setup used to form the metal matrix composite bodies in Example 2.

As shown in FIG. 5, a first stainless steel box 20 measuring about 5 inches by about 5 inches by about 4 inches high was prepared by lining the interior surfaces of the box with GRAFOIL® graphite foil 11 (Union Carbide Company, Danbury, Conn.) having a thickness of about 0.015 inch. An aluminum alloy ingot 13 weighing about 1979 grams and comprising by weight about 12% silicon, 5% magnesium and the balance aluminum, was placed into the steel box 20. About 2.6 grams of a high purity magnesium powder mixture 12 comprising particles ranging in size from about −50 mesh to about +100 mesh (Hart Metals, Tamaqua, Pa.) was evenly sprinkled onto the top surface of the aluminum alloy 13.

A second stainless steel box 30 measuring about 5 inches by about 5 inches by about 4 inches high was prepared by lining the interior surfaces of the box with GRAFOIL® graphite foil 21 (Union Carbide Company, Danbury, Conn.) having a thickness of about 0.015 inch. An aluminum alloy ingot 23 weighing about 2022 grams and comprising by weight about 12% silicon, 5% magnesium and the balance aluminum, was placed into the steel box 30. About 2.6 grams of a high purity magnesium powder mixture 22 comprising particles ranging in size from about −50 mesh to about +100 mesh (Hart Metals, Tamaqua, Pa.) was evenly sprinkled onto the top surface of the aluminum alloy 23.

One preform comprising the 220 grit silicon carbide and one preform comprising the 360 grit silicon carbide were then coated with an aqueous solution comprising DAG® 154 colloidal graphite (Acheson Collids Co., Port Huron, Mich.). Utilizing a foam brush, the surface of each preform to be placed in contact with the aluminum matrix alloy was coated with a light, uniform coating of the DAG® 154 colloidal graphite. The remaining five surfaces of each preform were coated three times with the DAG® 154 colloidal graphite. Before applying the second coating of DAG® 154 colloidal graphite, the first coating was allowed to dry substantially completely and before applying the third coating of DAG® 154 colloidal graphite, the second coating was allowed to dry substantially completely. After the DAG® 154 colloidal graphite had dried, the preform comprising the 220 grit silicon carbide 24 was placed into the second stainless steel box 30 and on the aluminum alloy ingot 23 and the preform comprising the 360 grit silicon carbide 14 was placed into the first stainless steel box 20 and on the aluminum alloy ingot 13.

The two stainless steel boxes were then each covered with a sheet of GRAFOIL® graphite foil 15. The stainless steel boxes covered with the GRAFOIL® graphite foil were then placed onto a graphite boat 25, which had previously been lined with GRAFOIL® graphite foil 26 to form a setup.

The setup was then placed into a controlled atmosphere vacuum furnace at a temperature of about 150° C. The furnace was evacuated to about 30 inches Hg and backfilled with nitrogen gas to about atmospheric pressure. The furnace was evacuated a second time to about 30 inches Hg and backfilled with nitrogen gas to about atmospheric pressure and a nitrogen gas flow rate of about 12 liters per minute was established through the furnace.

The furnace temperature was increased from about 150° C. to about 250° C. at a rate of about 100° C. per hour. After maintaining a temperature of about 250° C. for about 10 hours, the furnace temperature was increased from about 250° C. to about 825° C. at a rate of about 100° C. per hour. After maintaining a temperature of about 825° C. for about 24 hours, the setup was removed from the furnace and the steel boxes and their contents were placed onto an about 2 inch thick layer of FIBERFRAX® ceramic insulation material (Carborundum Company, Niagara Falls, N.Y.) which was supported by a refractory plate.

At room temperature, the assemblies were disassembled to reveal that the aluminum metal had spontaneously infiltrated the preforms.

While the preceding discussion includes very particular disclosures, various modifications to the disclosure should occur to an artisan of ordinary skill, and all such modifications should be considered to be within the scope of the claims appended hereto.

What is claimed is:

1. A method for making a preform for use in composite formation processes, comprising:

combining at least one low temperature organic binder and at least one high temperature binder and at least one filler to form a substantially homogeneous mixture with good flowability, wherein said at least one low temperature organic binder and said at least one high temperature binder have a combined weight of about 1–15% of the total weight of said substantially homogeneous mixture;

placing said substantially homogeneous mixture into a mold having a cavity therein which corresponds substantially in shape to a desired shape of the preform;

applying low pressure to said substantially homogeneous mixture to cause said substantially homogeneous mixture to at least partially fill said cavity of said mold;

causing said at least one low temperature organic binder to at least partially set to result in the mixture assuming the shape of said cavity, thereby forming a shaped mixture;

heating said shaped mixture to a temperature range to result in removal of said at least one low temperature organic binder and at least partial setting of said at least one high temperature binder;

further heating said shaped mixture to cause at least partial sintering of said filler to occur to result in at least partially sintered preform; and providing said at least partially sintered preform for use in at least one composite formation process.

2. The method of claim 1, wherein said at least one low temperature organic binder comprises at least one material selected from the group consisting of thermosetting organic materials, self-setting organic materials and vapor-cured organic materials.

3. The method of claim 1, wherein said at least one low temperature organic binder comprises at least one material selected from the group consisting of thermal catalyzed binders, solid catalyzed binders and vapor catalyzed binders.

4. The method of claim 1, wherein said at least one low temperature organic binder comprises a thermosetting organic binder selected from the group consisting of phenol-formaldehyde resins, furan resins, phenolic resins and core oils.

5. The method of claim 1, wherein said at least one low temperature organic binder comprises at least one material selected from the group consisting of furan binders, phenolic binders and urethane binders.

6. The method of claim 1, wherein said at least one low temperature organic binder comprises at least one vapor catalyzed binder.

7. The method of claim 6, wherein said at least one vapor catalyzed binder comprises at least one material selected from the group consisting of phenolic urethane-amine binders and furan-$SO_2$ binders.

8. The method of claim 1, wherein said at least one high temperature binder comprises at least one inorganic material.

9. The method of claim 8, wherein said at least one inorganic material comprises at least one colloidal oxide.

10. The method of claim 1, wherein said at least one filler material comprises at least one inorganic material.

11. The method of claim 10, wherein said at least one inorganic material comprises a ceramic material.

12. The method of claim 11, wherein said at least one ceramic material comprises at least one material selected from the group consisting of hollow bodies, particulates, powders, fibers, whiskers, spheres, bubbles, metal wool, plates, aggregate, wires, rods, bars, wire cloth, platelets, pellets, tubes, refractory fiber cloth, tubules, or mixtures thereof.

13. The method of claim 11, wherein said ceramic material comprises a particulate in a size range of from about 1000 grit to about 200 grit.

14. The method of claim 1, wherein said good flowability means that said mixture can assume the shape of said cavity at pressures less than 500 psi.

15. The method of claim 14, wherein said mixture in said mold is at least 50 volume percent solids.

16. The method of claim 1, wherein said at least partial sintering of said filler results in a partially sintered preform having a porosity of from about 30% to about 60%.

17. The method of claim 1, wherein said composite formation process comprises at least one process selected from the group consisting of a metal or metal alloy matrix composite formation process, a ceramic matrix composite formation process, a polymer matrix composite formation process, a glass matrix composite formation process and an intermetallic matrix composite formation process.

18. A method for making a preform for use in composite formation processes, comprising:

combining at least one low temperature organic binder and at least one high temperature binder and at least one filler to form a substantially homogeneous mixture with good flowability, wherein said at least one low temperature organic binder and said at least one high temperature binder have a combined weight of about 1–15% of the total weight of said substantially homogeneous mixture;

placing said mixture into a mold having a cavity therein which corresponds substantially in shape to a final desired shape of the preform, wherein said placing of said mixture into said mold comprises utilizing a sand molding or core making piece of equipment;

applying low pressure to said substantially homogeneous mixture to cause said substantially homogeneous mixture to at least partially fill said cavity of said mold;

causing said at least one low temperature organic binder to at least partially set to result in the mixture assuming the shape of said cavity, thereby forming a shaped mixture;

heating said shaped mixture to a temperature range to result in removal of said at least one low temperature organic binder and at least partial setting of said at least one high temperature binder;

further heating said shaped mixture to cause at least partial sintering of said filler to occur to result in a partially sintered preform; and providing said at least partially sintered preform for use in at least one composite formation process.

19. The method of claim 18, wherein said equipment is automatic or fully automatic.

20. The method of claim 18, wherein said composite formation process comprises at least one process selected from the group consisting of a metal or metal alloy matrix composite formation process, a ceramic matrix composite formation process, a polymer matrix composite formation process, a glass matrix composite formation process and an intermetallic matrix composite formation process.

21. The method of claim 1, wherein said at least one low temperature binder and said at least one high temperature binder have a combined weight of about 4–11% of the total weight of said substantially homogeneous mixture.

22. The method of claim 18, wherein said at least one low temperature organic binder comprises at least one material selected from the group consisting of thermosetting organic materials, self-setting organic materials and vapor-cured organic materials.

23. The method of claim 18, wherein said at least one low temperature organic binder comprises at least one material selected from the group consisting of thermal catalyzed binders, solid catalyzed binders and vapor catalyzed binders.

24. The method of claim 18, wherein said at least one low temperature organic binder comprises a thermosetting organic binder selected from the group consisting of phenol-formaldehyde resins, furan resins, phenolic resins and core oils.

25. The method of claim 18, wherein said at least one low temperature organic binder comprises at least one material selected from the group consisting of furan binders, phenolic binders and urethane binders.

26. The method of claim 18, said at least one low temperature organic binder comprises at least one vapor catalyzed binder.

27. The method of claim 26, wherein said at least one vapor catalyzed binder comprises at least one material selected from the group consisting of phenolic urethane-amine binders and furan-$SO_2$ binders.

28. The method of claim 18, wherein said at least one high temperature binder comprises at least one inorganic material.

29. The method of claim 28, wherein said at least one inorganic material comprises at least one colloidal oxide.

30. The method of claim 18, wherein said at least one filler material comprises a ceramic material.

31. The method of claim 30, wherein said ceramic material comprises a particulate in a size range of from about 1000 grit to about 200 grit.

32. The method of claim 18, wherein said at least one low temperature binder and said at least one high temperature binder have a combined weight of about 4–11% of the total weight of said substantially homogeneous mixture.

* * * * *